UNITED STATES PATENT OFFICE.

MAJOR E. HOLMES, OF LAKEWOOD, OHIO, ASSIGNOR TO NATIONAL CARBON COMPANY, INC., A CORPORATION OF NEW YORK.

ELECTRIC BATTERY.

1,314,594.  Specification of Letters Patent.  Patented Sept. 2, 1919.

No Drawing.   Application filed February 25, 1918.   Serial No. 219,129.

*To all whom it may concern:*

Be it known that I, MAJOR E. HOLMES, a citizen of the United States, residing at Lakewood, in the county of Cuyahoga and State of Ohio, have invented a certain new and useful Improvement in Electric Batteries, of which the following is a full, clear, and exact description.

This invention relates to electric batteries and is particularly applicable to dry cells.

As it well known, the usual dry cell has a lining of pulp-board or similar bibulous material between the mix and the zinc can. The porosity of the lining is such that there are differences in concentration of electrolyte adjacent the zinc and corrosion on open circuit takes place to a greater or less extent. It is the aim of my invention to reduce this difficulty.

While the holes in strawboard or pulp-board appear small to the naked eye, they nevertheless are of such size as not to retain the moisture effectively. To reduce the size of the pores and make the porosity more uniform, I incorporate fine wheat flour in the wet paper pulp before the paper board is rolled therefrom. The mass should be stirred well to thoroughly mix the flour with the pulp, and then rolled or compressed into sheet form. The paper pulp may contain a preservative such as mercuric or zinc chlorid to prevent the raw flour from souring or spoiling under the action of moisture.

The quantity of flour in the paper pulp may be varied between rather wide limits. It will be satisfactory if enough flour is used to incorporate from 5 to 20 grams in a lining for the so-called No. 6 dry cell, the lining being approximately 8 inches long, 6 inches wide and .02 inches in thickness.

By the process described the flour will fill all the pores of the paper and cause it to retain the electrolyte more effectively and to distribute it more uniformly. Corrosion of the zinc on open circuit will therefore be reduced.

Having described my invention, what I claim is:—

1. A dry cell lining having cereal flour distributed throughout its mass.

2. The process of making a dry cell lining which consists in intimately mixing cereal flour with paper pulp and then compressing the mixture into sheets of the desired thickness.

In testimony whereof, I hereunto affix my signature.

MAJOR E. HOLMES.